United States Patent
Park et al.

(10) Patent No.: US 7,145,743 B2
(45) Date of Patent: Dec. 5, 2006

(54) APPARATUS AND METHOD FOR UNLATCHING A HEAD WITHIN A DATA STORAGE DEVICE

(75) Inventors: Cheol-Hoon Park, Suwon-Si (KR); Kwang-Jo Jung, Suwon-Si (KR); Sang-Hoon Chu, Seoul (KR); Yong-Gwon Lee, Suwon-Si (KR); Chul Park, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 10/986,581

(22) Filed: Nov. 12, 2004

(65) Prior Publication Data

US 2005/0117245 A1 Jun. 2, 2005

(30) Foreign Application Priority Data

Nov. 28, 2003 (KR) ............... 10-2003-0085768

(51) Int. Cl.
*G11B 21/02* (2006.01)
(52) U.S. Cl. .................................................. 360/75
(58) Field of Classification Search ............ 360/78.04, 360/75, 78.09, 78.12, 78.14, 77.02; 318/677, 318/456, 560
See application file for complete search history.

(56) References Cited

U.S. PATENT DOCUMENTS

| | | | | |
|---|---|---|---|---|
| 4,588,937 A | * | 5/1986 | Fujioka et al. .............. 318/677 |
| 5,600,219 A | * | 2/1997 | Gomez ......................... 318/456 |
| 5,659,438 A | * | 8/1997 | Sasamoto et al. ......... 360/78.09 |
| 6,025,968 A | * | 2/2000 | Albrecht ....................... 360/75 |
| 6,212,027 B1 | * | 4/2001 | Lee et al. ................. 360/78.14 |
| 6,222,696 B1 | * | 4/2001 | Kim ............................ 360/75 |
| 6,252,364 B1 | | 6/2001 | Chiang et al. .............. 318/280 |
| 6,320,717 B1 | | 11/2001 | Feng ............................ 360/75 |
| 6,414,815 B1 | * | 7/2002 | Lee .......................... 360/78.12 |
| 6,496,324 B1 | | 12/2002 | Golowka et al. ......... 360/78.12 |
| 6,566,832 B1 | * | 5/2003 | Ataee ......................... 318/560 |
| 6,643,088 B1 | * | 11/2003 | Kawachi ...................... 360/75 |
| 6,674,604 B1 | * | 1/2004 | Teng et al. .............. 360/78.04 |
| 6,757,127 B1 | * | 6/2004 | Teng et al. .............. 360/77.02 |
| 6,900,959 B1 | * | 5/2005 | Gardner et al. .......... 360/78.04 |
| 2001/0019463 A1 | | 9/2001 | Drouin | |
| 2001/0026415 A1 | | 10/2001 | Kusumoto | |
| 2002/0018313 A1 | | 2/2002 | Moon et al. | |

* cited by examiner

*Primary Examiner*—Fred F. Tzeng
(74) *Attorney, Agent, or Firm*—Monica H. Choi

(57) ABSTRACT

For unlatching a head within a data storage device, such as a HDD (hard disc drive), a VCM (voice coil motor) amplifier with a switch is used for applying at least one cycle of an acceleration current pulse to a voice coil motor (VCM) for unlatching the head during an acceleration time zone. An analog to digital converter samples a characteristic of the VCM for indicating a speed of the head during the acceleration time zone. An unlatch controller terminates the acceleration time zone when the speed of the head is higher than a threshold speed, for more stable operation of the head but with guarantee of unlatching, regardless of the latch force within the HDD.

25 Claims, 7 Drawing Sheets

APPARATUS AND METHOD FOR UNLATCHING A HEAD WITHIN A DATA STORAGE DEVICE

BACKGROUND OF THE INVENTION

This application claims priority to Korean Patent Application No. 2003-0085768, filed on Nov. 28, 2003, in the Korean Intellectual Property Office, the disclosure of which is incorporated herein in its entirety by reference.

1. Field of the Invention

The present invention relates generally to data storage devices such as a hard disc drive, and more particularly, to an apparatus and method for limiting a speed of a head within the data storage device during unlatching with guarantee of unlatching regardless of a latch force.

2. Description of the Related Art

A hard disc drive (HDD) is an apparatus for magnetically writing/reading data on/from a rotating magnetic disc. The hard disc drive, which accesses bulk data at high speed, is widely used as an auxiliary memory device of a computer system.

A latch system of the hard disc drive prevents a disc and a head from being physically damaged from an external force when the hard disc drive is not operating. Such a latch system may be implemented with a magnetic mechanism, an electromagnetic mechanism, or a ramp loading mechanism. However, the magnetic mechanism is mainly used because of its relative simplicity. In the magnetic mechanism for the latch system, the position of the head is latched to a parking zone by a magnetic force of a magnetic latch located on the outside of a head assembly.

When the hard disc drive begins to operate, the head that is initially within the parking zone is moved onto a data zone of the disc. Such movement of the head is termed an "unlatch operation".

The unlatch operation includes an acceleration time zone during which an acceleration current is input to a voice coil motor (VCM) to generate a torque on the head. Such a torque on the head overcomes a magnetic force of the magnetic latch. The unlatch operation also includes a brake time zone during which the head is stopped from accelerating after the head has already moved out from the parking zone.

The magnetic force used to latch the head to the parking zone varies widely among hard disc drives. In the prior art, for addressing such a variation, a magnitude and a time period of application of an acceleration current is determined for a greatest magnetic force to guarantee unlatching of the head for any hard disc drive.

Unfortunately, such prior art magnitude and time period of application of the acceleration current results in disadvantages. For example, in a hard disc drive with relatively lower magnetic force, the resulting moving speed of the head is excessively high. Such high moving speed of the head causes instability of a flying height of the head which may result in the head contacting the disc. Such contact detrimentally results in a scratch being generated on the surface of the disc.

In addition, with instability of the flying height of the head, servo information recorded on the disc is difficult to read with the head. Such servo information includes a servo sync mark, a track number, and a sector number, which are recorded in a servo sector. In order to stably read such servo information, the moving speed of the head is desired to be limited to be below a maximum moving speed.

However, in the prior art unlatch operation, an acceleration current with same magnitude and time period of application is used for any hard disc drive. Because the magnetic forces of the magnetic latches within hard disc drives vary, the moving speed of the head correspondingly varies and is not limited in the prior art unlatch operation.

SUMMARY OF THE INVENTION

Accordingly, in a general aspect of the present invention, an unlatch operation limits the moving speed of the head to a threshold speed for a data storage device having a magnetic latch with any magnetic force.

According to an aspect of the present invention, for unlatching a head within a data storage device, a VCM (voice coil motor) amplifier with a switch is used for applying at least one cycle of an acceleration current pulse to a voice coil motor (VCM) for unlatching the head during an acceleration time zone. An analog to digital converter samples a characteristic of the VCM for indicating a speed of the head during the acceleration time zone. An unlatch controller terminates the acceleration time zone when the speed of the head is higher than a threshold speed.

In another embodiment of the present invention, the unlatch controller controls the switch to couple the acceleration current from the VCM amplifier to the VCM for an on-time period of the cycle of acceleration current pulse, and controls the switch to uncouple the acceleration current from the VCM for an off-time period of the cycle.

According to a further embodiment of the present invention, the analog to digital converter samples a back electromotive force of the VCM that indicates the speed of the head during the off-time period of the cycle of acceleration current pulse. For example, the analog to digital converter samples the back electromotive force of the VCM, toward the end of the off-time period of the cycle.

In another embodiment of the present invention, a period, T, of the cycle of acceleration current pulse is comprised of the on-time period and the off-time period. In that case, T is less than Tmax, with Tmax being a length of the acceleration time zone for the head that is latched with a maximum magnetic force among samples of data storage devices.

In a further embodiment of the present invention, the analog to digital converter samples the back electromotive force of the VCM during the off-time period when substantially zero acceleration current is applied on the VCM.

In an additional embodiment of the present invention, the unlatch controller controls the VCM amplifier and the switch to apply a brake current to the VCM during the brake time zone after termination of the acceleration time zone.

The unlatching method and apparatus of such embodiments of the present invention are applied to particular advantage when the data storage device is a HDD (hard disc drive). However, the present invention may also be practiced for unlatching a head within any other types of data storage devices.

In this manner, the head is unlatched from the parking zone with a moving speed that is limited to be below a maximum threshold speed, regardless of the magnetic force within any HDD. Such limited speed is advantageous for preventing contact of the head to the data surface of a disc and for enhancing the head's ability to read servo information from the disc.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, 9, and 10 refer to elements having similar structure and/or function.

DETAILED DESCRIPTION OF THE INVENTION

Hereinafter, embodiments of the present invention are described in detail with reference to the accompanying drawings. The present invention is described herein for a HDD (hard disk drive). However, the present invention may be practiced for unlatching a head in any other types of data storage devices.

A HDD is mainly comprised of two parts. A first part, commonly called a printed circuit board assembly (PCBA), is a circuit assembly with most of the circuit components of the HDD being mounted on a printed circuit board (PCB). A second part, commonly called a head disc assembly (HDA), is a mechanical assembly with most of the mechanical components of the HDD, such as a head and magnetic discs, and with some of the circuit components of the HDD.

Figure 1:
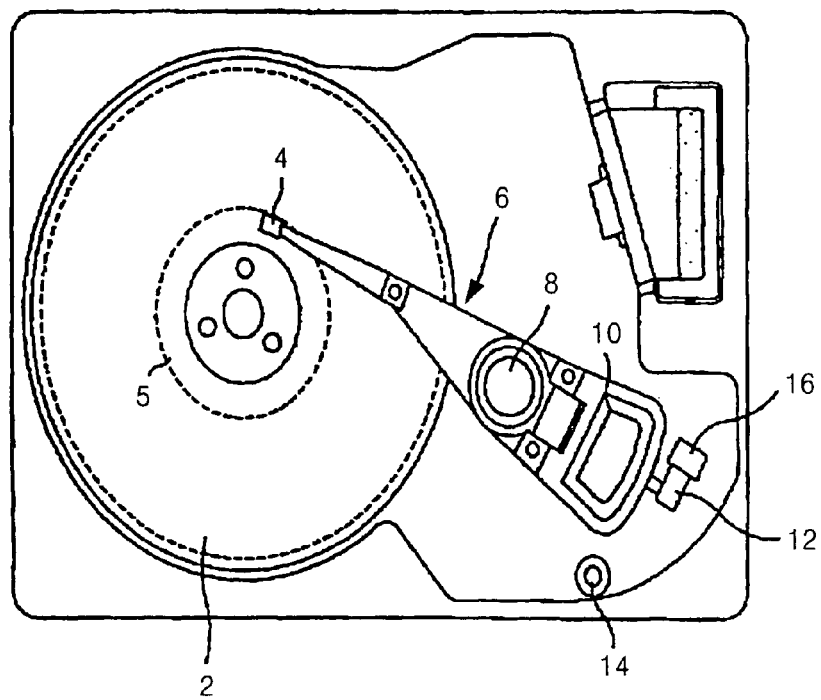
FIG. 1 shows a schematic diagram of a hard disc assembly of a HDD (hard disc drive)

FIG. 1 shows a schematic diagram of the HDA. Referring to FIG. 1, data transmitted from a host computer (not shown) is magnetically written by a head 4 on a disc 2 while the disc 2 is rotated by a spindle motor. The head 4 attached to an end of an actuator 6 for writing or reading data on/from the disc 2 is flying over the disc 2 at a predetermined height as the disc 2 rotates. One end of the actuator 6 has the head 4 attached thereon, while a steel plate (i.e., a magnetic latch) 12 is attached to the other end of the actuator 6. The steel plate 12 is easily attracted to a magnet 16. The actuator 6 is supported by a pivot bearing 8.

A voice coil motor (VCM) 10 is disposed on the actuator 6 between the pivot bearing 8 and the steel plate 12. The actuator 6 moves the head 4 in a radial direction of the disc 2 by rotating about the pivot bearing 8 when the VCM 10 is driven with a current.

For preventing the head 4 from moving outside of the disc 2, an outer crash stopper 14 is installed on a base. When the HDD is not being used, the position of the actuator 6 is fixed when the magnetic latch 12 of the actuator 6 is attached to the magnet 16 (which is also an inner crash stopper) by a magnetic force, as illustrated in FIG. 1. In such a state, the head 4 is parked in a parking zone 5, and the head 4 is also considered to be "latched".

Figure 2:
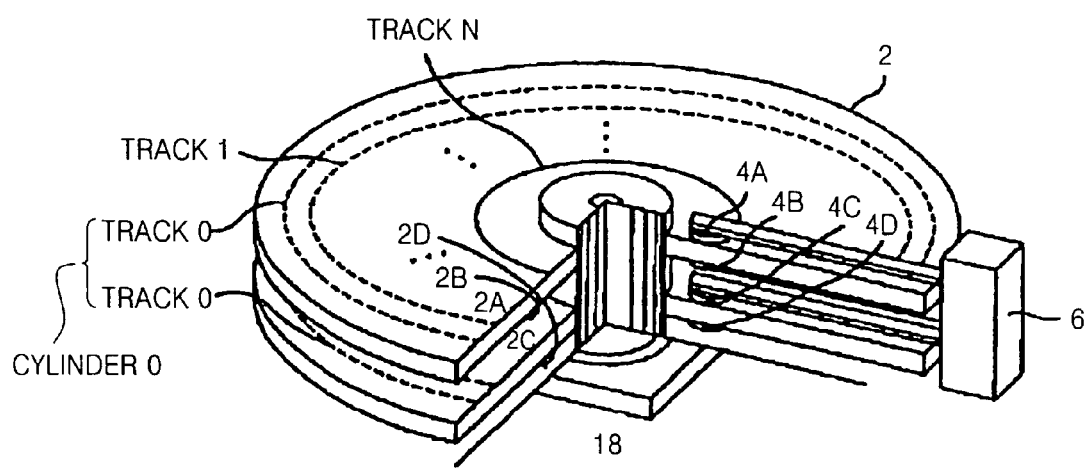
FIG. 2 shows a partially broken away perspective view of discs in a HDD having multiple platters.

FIG. 2 shows a partially broken away perspective view of discs in a HDD having multiple platters to maximize data storage capacity. Referring to FIG. 2, two platters 2 are installed about a driving axis of a spindle motor 18. In addition, heads 4A–4D are attached to arms extending in a vertical direction of an actuator 6. Tracks are arranged on surfaces 2A–2D of the platters 2 along a concentric circle, and track numbers (track 0–track N) are given to each track. Tracks on the surfaces 2A–2D of the platters 2 relevant to the heads 4A–4D with a same track number are commonly called a cylinder. Accordingly, same track numbers of the platters 2 are defined by one cylinder number. For example, all tracks with track number 0 on the surfaces 2A–2D of the platters 2 have cylinder number 0.

The HDD selectively locates the heads 4A–4D on a desired track of the discs 2 by a servo mechanism. The heads 4A–4D are located over a certain track by two servo control modes typically termed "track seek" and "track following". For track seek, the heads 4A–4D are moved from a current track to a desired track. For track following, after the heads 4A–4D are located on a target track, the heads 4A–4D are maintained to follow a central line of the target track for a successful read or write operation.

Figure 3:
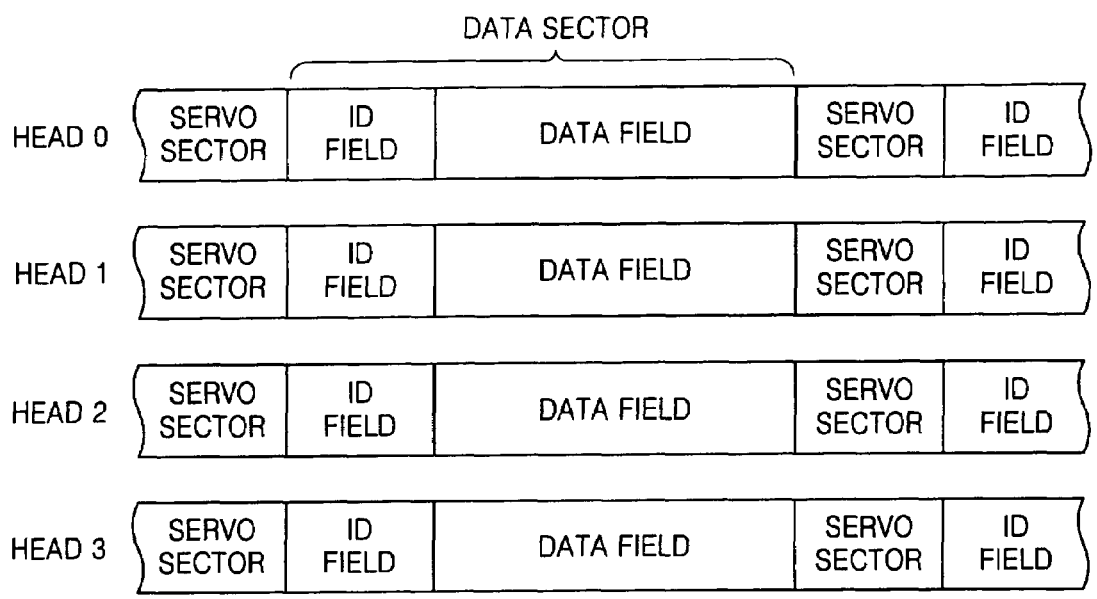
FIG. 3 illustrates a data format of a track in a HDD.

For such track seek, track following, and also for data reading/writing, a track on a disc of the HDD has a data format as shown in FIG. 3. Referring to FIG. 3, servo sectors and data sectors are alternately disposed on each track for the four heads of FIG. 2 (i.e., head 0, head 1, head 2, and head 3). Each of the servo sectors includes data used to perform servo control such as track seek and track following, whereas each data sector is for having user data written therein. The servo sectors typically occupy 9–11% of the total capacity of the tracks.

FIG. 3 shows an example of the sector format for the four tracks corresponding to a cylinder for the four heads in the HDD of FIG. 2. In FIG. 3, the data sector is commonly divided into an identification (ID) field and a data field. Head information for identifying a relevant data sector is recorded in the ID field, and digital data is recorded in the data field. The servo sectors are located before and after the data sector.

Figure 4:
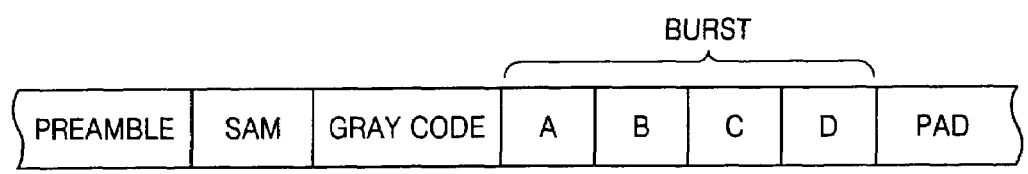
FIG. 4 illustrates a data format of a servo sector of FIG. 3.

FIG. 4 shows a typical data format of the servo sector of FIG. 3. Referring to FIG. 4, the servo sector includes a preamble, a servo address mark (SAM), a gray code, bursts A, B, C, and D, and a PAD. The preamble indicates the disposition of the servo sector and simultaneously provides a clock sync being used when servo information is read and a gap on a forehead of the servo sector. Thus, the preamble is also referred to as a servo sync. The SAM indicates a start of a servo sector and provides a sync for reading the following gray code. Thus, the SAM provides a reference point to generate various timing pulses related to servo control. The gray code provides information of a track, i.e., track information. The bursts A, B, C, and D provide position error signals (PESs) required for track seek and track following. The PAD provides a transition margin from a servo sector to a data sector.

Figure 5:
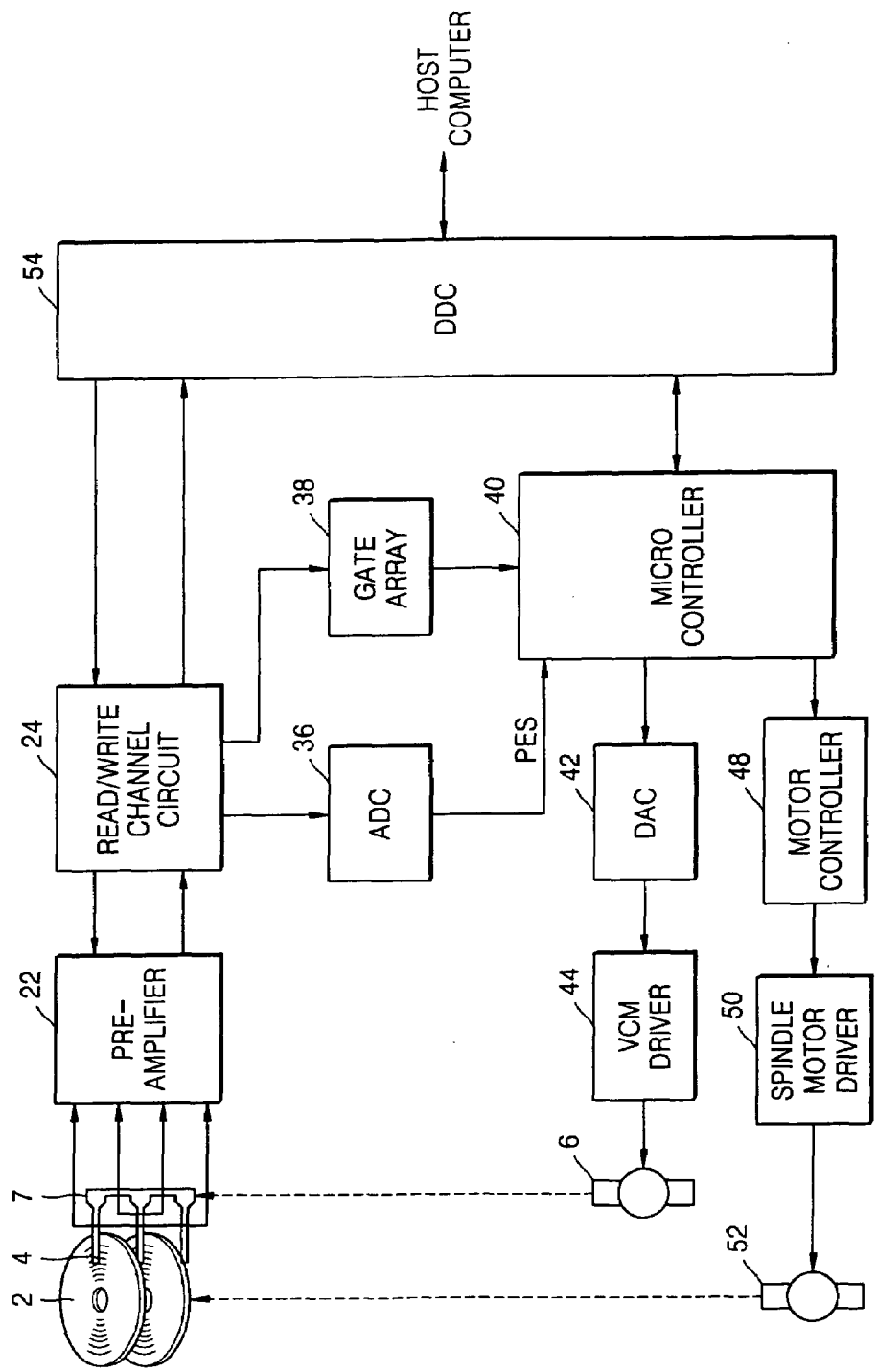
FIG. 5 shows a block diagram of a conventional HDD.

FIG. 5 is a block diagram of an example conventional HDD using 2 platters. Referring to FIG. 5, the discs 2 are rotated by a spindle motor 52. Heads 4 for the discs 2 are placed over surfaces of the discs 2. Each of the heads 2 is installed on a front end of an arm vertically extending from an arm assembly 7 of an actuator 6. A pre-amplifier 22 pre-amplifies a signal picked up by each of the heads 2 when data is read from the disc 2. Alternatively, the pre-amplifier 22 pre-amplifies a signal as encoded by a read/write channel circuit 24 to be written on the discs 2 by the heads 2.

The read/write channel circuit 24 detects a data pulse from a read signal from the pre-amplifier 22, decodes the data pulse, and transmits the decoded data pulse to a disc data controller (DDC) 54. Also, the read/write channel circuit 24 decodes write data transmitted from the DDC 54 and transmits the decoded write data to the pre-amplifier 22. The DDC 54 writes data received from a host computer (not shown) on the disc 2 via the read/write channel circuit 24 and the pre-amplifier 22. Also, the DDC 54 interfaces the host computer with a micro controller 40.

The micro controller 40 controls track seek and track following operations for the HDD in response to a read or write command received from the host computer. A VCM driver 44 receives a value for servo control (head position control) from the micro controller 40 via a digital-to analog converter (DAC) 42, generates a driving current to drive the actuator 6, and outputs the driving current to the VCM on the actuator 6.

The actuator 6 moves the head 4 in a radial direction of the disc 2 in response to a direction and level of the driving current output from the VCM driver 44. A motor controller 48 transmits a control value for rotation control of the disc 2 to a spindle motor driver 50, and the spindle motor driver 50 rotates the disc 2 by driving the spindle motor 52 in response to the control value.

An analog-to-digital converter (ADC) 36 converts a PES (position error signal) based on a burst signal of servo information transmitted from the read/write channel circuit 24 into a digital signal and outputs the digital signal to the micro controller 40. A gate array 38 generates timing signals required for reading/writing, decodes the servo information, and transmits the decoded servo information to the micro controller 40.

The HDD parks the head 4 in a parking zone 5 when the HDD does not operate. At this time, as described in reference to FIG. 1, the magnetic latch 12 attached to an end of the actuator 6 is stuck to the magnet 16 with a magnetic force. When the HDD begins to operate, the micro controller 40 controls the movement of the head 4 such that the head 4 moves out of the parking zone 5 to be over a data zone on the disc 2.

Figure 6:
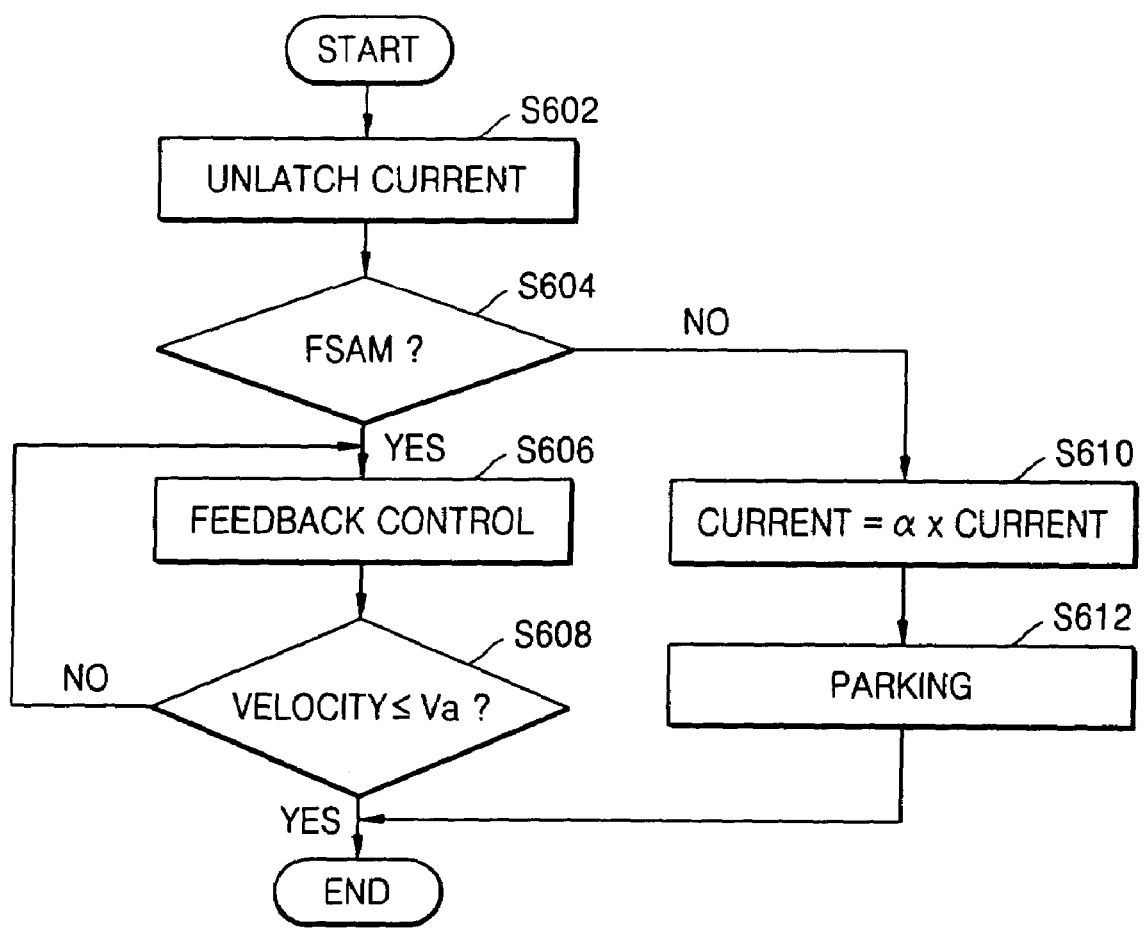
FIG. 6 illustrates a flowchart of steps for a conventional unlatch operation for a HDD.
Figure 7:
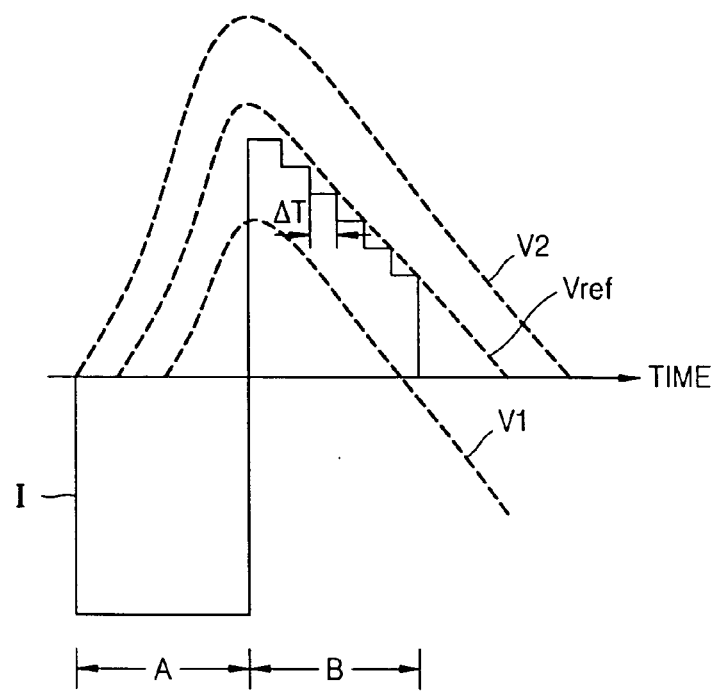
FIG. 7 shows a graph illustrating correlation between current input to a VCM (voice coil motor) and the moving speed of the head of the HDD from the unlatch operation of FIG. 6.

FIG. 6 shows a flowchart of steps for a conventional unlatch operation. Referring to FIGS. 6 and 7, when the HDD begins to operate, the micro controller 40 controls the spindle motor 52 to rotate at a regular speed. Thereafter, the micro controller 40 outputs a current of a predetermined magnitude to the VCM on the actuator 6 via the VCM driver 44 such that the actuator 6 overcomes a latch force (a magnetic force) of the magnet 16 (step S602 of FIG. 6).

A large enough acceleration current is input to the VCM of the actuator 6 for a long enough time period (acceleration time zone) in step S602 such that the actuator 6 overcomes the magnetic force of the magnet 16 and moves the head 4 to the data zone of the disc 2. After the acceleration time zone, servo data is attempted to be read via the head 4, and it is determined whether a servo address mark is properly found, that is, whether a fault servo address mark (FSAM) is not generated (step S604 of FIG. 6).

If the servo data is read via the head 4, that is, if the servo address mark is properly found, a moving speed of the head 4 is decelerated until the speed reaches a predetermined speed (i.e., Va) by a speed feedback controller (steps S606 and S608 of FIG. 6). The moving speed of the head 4 is calculated by the speed feedback controller by referring to the servo data. For example, the moving speed of the head 4 is calculated as (a track number in a current sample—a track number in a previous sample)/(a sampling time period). Each track number is obtained from a gray code.

If the servo data cannot be read in step S604, that is, if the servo address mark cannot be properly found, the current to the VCM is periodically reduced at a predetermined rate during a brake time zone (step S610 of FIG. 6). Thus, if the servo address mark cannot be properly found, the moving speed of the head 4 is decelerated by a predetermined brake pattern without regard to the latch force in step S610. With such deceleration current, the head 4 is eventually parked in step S612.

FIG. 7 shows a graph illustrating a correlation between the level of current to the VCM and a moving speed of the head, during operation according to the flowchart of FIG. 6. Referring to FIG. 7, in an initial unlatch operation, acceleration current (I) is provided to the VCM during an acceleration time zone (time zone A of FIG. 7) so that the actuator 6 overcomes the magnetic force of the magnet 16, and the head 4 is moved from the parking zone 5.

After the acceleration time zone A, a brake current with a reversed direction is provided to the VCM during a brake time zone (time zone B of FIG. 7). In addition, the magnitude of the brake current is lowered step by step during the brake time zone. For example, if a brake current with a magnitude of I is provided to the VCM during a first time period $\Delta T$ during the brake time zone, a brake current with a magnitude of $I*\alpha$ ($\alpha<1$) is provided to the VCM during a subsequent time period $\Delta T$.

In the conventional unlatch operation, the magnitude (I) and the duration (A) of the acceleration current correspond to a maximum magnetic force among sample latches. Thus, even if magnetic forces of the latches vary, the head is ensured of being unlatched from the parking zone.

However, such an acceleration current applied for any HDD is also disadvantageous because the magnetic forces vary among the HDDs. For example, for an HDD with lower magnetic force, the resulting moving speed of the head after the acceleration time zone is excessively high such that a flying height of the head is unstable. Such instability of the flying height may result in contact between the head and the disc. Such contact may result in a scratch being generated on the surface of the disc. In addition, servo information recorded on the disc may be difficult to read by the head with such instability of the flying height. Alternatively, for a HDD with higher magnetic force, the head may not be unlatched from the parking zone.

FIG. 7 illustrates different moving speeds of the head with a same acceleration current in HDDs with different magnetic forces of the magnetic latch system. As shown in FIG. 7, for the same acceleration current and brake current provided to the VCM of the actuator, the resulting moving speeds of the head are different (such as V1, Vref, and V2 in FIG. 7). In FIG. 7, Vref is the speed profile (i.e., speed versus time) of the head when optimum acceleration of the head is achieved. V1 is the speed profile of the head when the acceleration of the head is not sufficient, and V2 is the speed profile of the head when the acceleration is excessive.

With the speed profile V2, the moving speed of the head is much greater than a threshold speed when the head has been moved out of the parking zone at the end of the acceleration time zone. Such excessive speed may result in problems including a scratch to the disc generated when the head contacts the disc. In addition, with such excessive speed, the servo information may not be easily read from the disc by the head. Such excessive speed typically results when a HDD has a relatively lower magnetic force for its latch system.

On the other hand, with the speed profile V1, the moving speed of the head is much less than a threshold speed at the end of the acceleration time zone. In that case, the head has not been properly unlatched after the acceleration time zone. Such a situation may occur when the magnetic force of the latch system in the HDD is relatively greater.

Korean Patent Application No. 1999-65645 filed on Aug. 5, 1999, with the present Assignee, discloses a method of responding to different latch forces of HDDs by providing a gradual unlatch force during the acceleration time zone. However, such a method determines whether the head reaches the data zone of the disc using servo information read via the head, and the moving speed of the head is not limited.

The present invention deals with the different latch forces within HDDs by determining the moving speed of the head during the acceleration time zone. If the moving speed of the head is higher than a threshold speed indicating that the head is already moved out of a parking zone, the acceleration time zone is terminated, and a brake time zone begins.

The moving speed of the head indicates whether the head is separated from the parking zone. If the moving speed of the head is higher than the threshold speed, the head is separated and moved away from the parking zone. In that case, the acceleration operation stops, and a brake operation starts. By limiting the moving speed of the head to the threshold speed during the unlatch operation, a flying height of the head is stably maintained, and a servo signal is more easily read by the head.

According to an embodiment of the present invention, the moving speed of the head is indicated by sampling a back electromotive force of the VCM. An acceleration current provided to the VCM is desired to be zero for accurate measurement of the back electromotive force of the VCM. Thus, the acceleration current with a pulse pattern is used in an embodiment of the present invention. That is, the back electromotive force of the VCM is sampled after waiting until the acceleration current becomes substantially zero by using the acceleration current with the pulse pattern.

Figure 8:
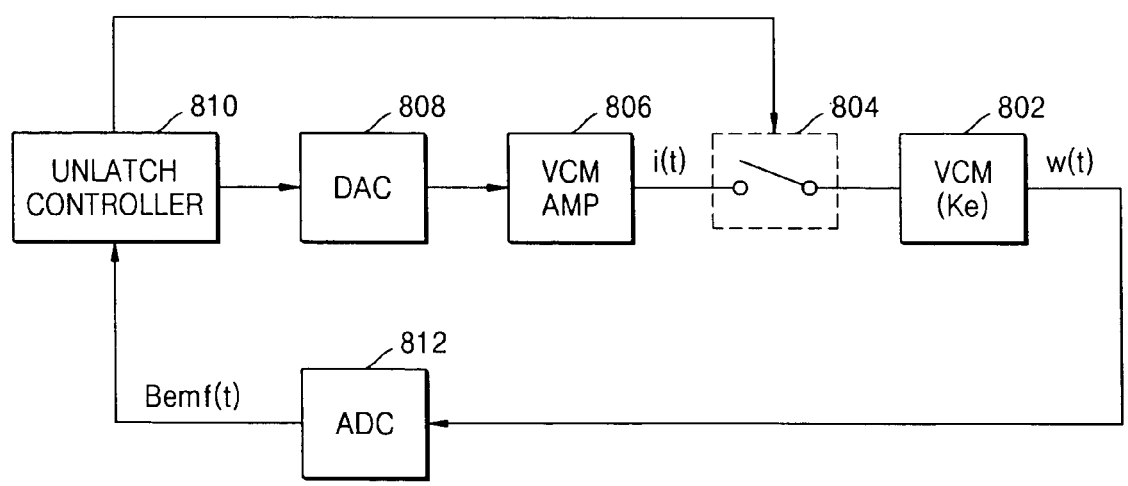
FIG. 8 is a block diagram of an unlatch apparatus according to an embodiment of the present invention.
Figure 9:
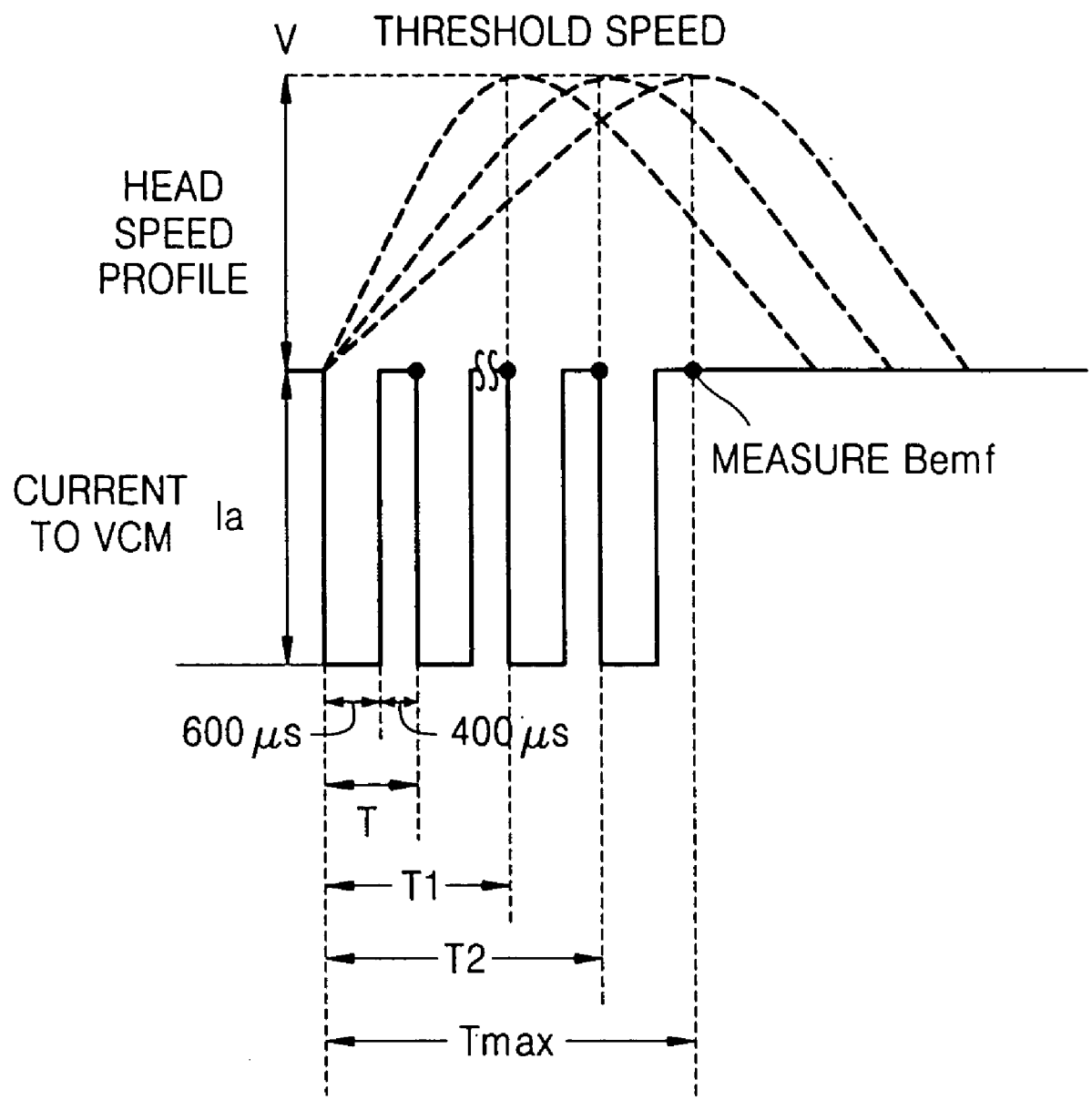
FIG. 9 is a graph illustrating operation of the unlatch apparatus of FIG. 8.
Figure 10:
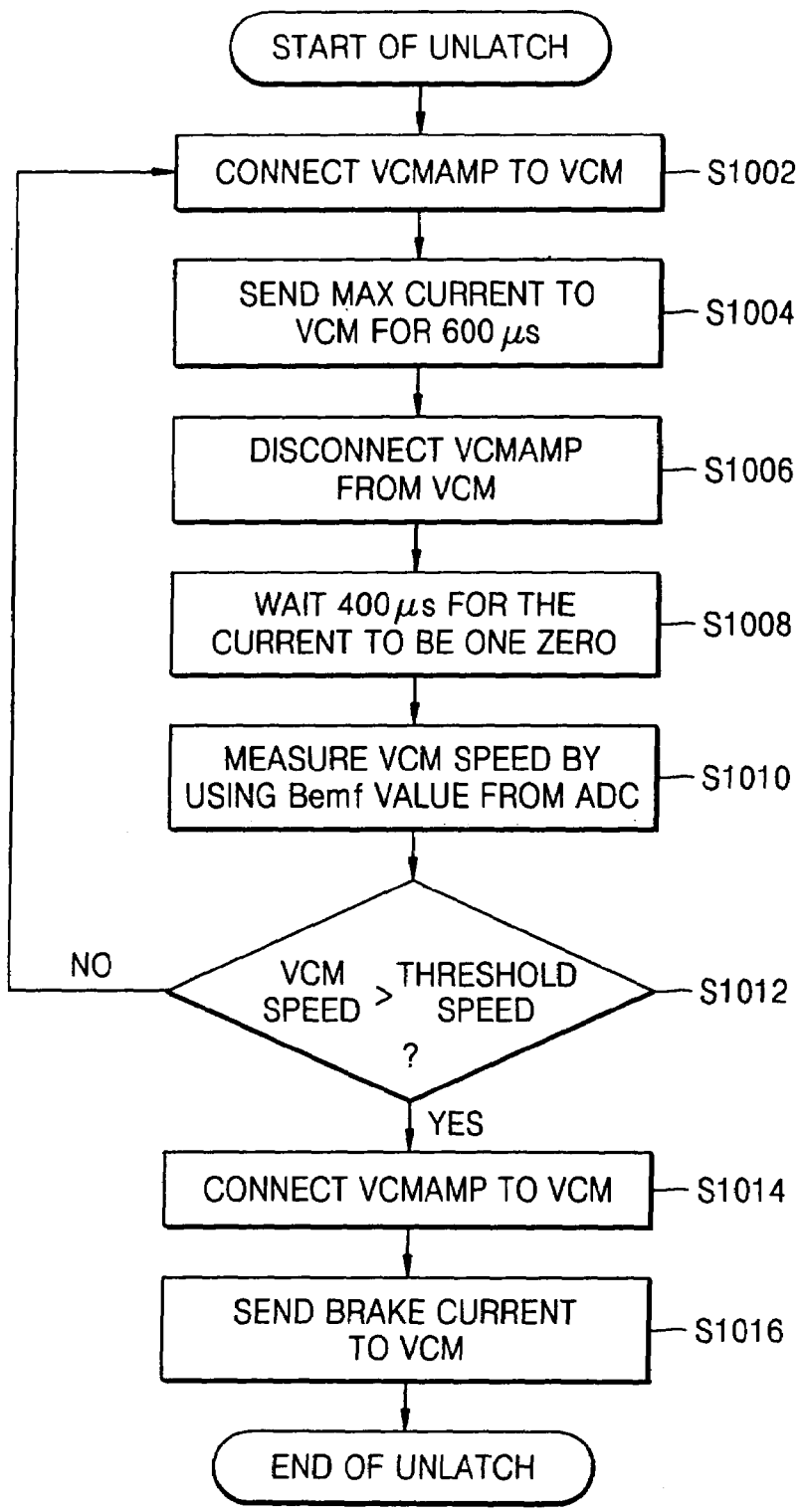
FIG. 10 is a flowchart of steps for an unlatch operation performed by the components of FIG. 8, according to an embodiment of the present invention.

FIG. 8 shows a block diagram of an unlatch apparatus according to an embodiment of the present invention. Components of FIG. 8 are formed as parts of a HDD in an embodiment of the present invention. The unlatch apparatus of FIG. 8 includes a VCM 802, a VCM amplifier 806, a switch 804, an ADC 812, and an unlatch controller 810. FIG. 9 illustrates various possible speed profiles during the acceleration time zone and the break time zone of the unlatch apparatus of FIG. 8. FIG. 10 illustrates a flow-chart of steps during operation of the unlatch apparatus of FIG. 8.

The unlatch controller 810 controls the VCM amplifier 806 and the switch 804 to provide an acceleration current to the VCM during the acceleration time zone and to provide a brake current to the VCM during the brake time zone. Referring to FIG. 9, the acceleration time zone is the time period when a speed profile increases whereas the brake time zone is the time period when the speed profile decreases.

The unlatch controller 810 determines the length of the acceleration time zone by comparing a moving speed of the head to a threshold speed. The moving speed of the head is determined from the back electromotive force (Bemf) of the VCM 802 as sampled by the ADC 812. The unlatch controller 810 controls the opening and closing of the switch 804 such that the acceleration current with a pulse pattern is provided to the VCM 802 during the acceleration time zone. A DAC 808 converts a current signal output from the unlatch controller 810 into an analog signal that is output to the VCM amplifier 806. The unlatch controller 810 is implemented as a micro processor operating by software, according to one embodiment of the present invention.

Referring to FIG. 9, the acceleration current provided to the VCM during the acceleration time zone is a pulse pattern. The acceleration current having the pulse pattern is desired for measuring a back electromotive force of the VCM 802. In addition, with the acceleration current having the pulse pattern, a torque for separating the magnetic latch is gradually increased.

As shown by the various speed profiles for different HDDs in FIG. 9, the lengths of the acceleration time zones vary because of the different magnetic forces of the latch systems of the different HDDs. For example, assume that Tmax is the length of the acceleration time zone for a HDD having a magnetic latch with a maximum magnetic force among sample HDDs.

In that case, T1 and T2 are each a length of the acceleration time zone for a respective HDD having a magnetic latch with a magnetic force that is less than the maximum magnetic force corresponding to Tmax. Thus, T1 and T2 are each less than Tmax. Nevertheless, for each speed profile in FIG. 9, the moving speed of the head is limited to the threshold speed. As a common example, the threshold speed for determining that a latch has been properly separated is 60 m/s (meters per second).

A moving speed of the head is proportional to a back electromotive force of the VCM 802. A voltage V(t) between two ends of the VCM 802 is indicated by the following Equation 1:

$$V(t)=R*i(t)+L\,di/dt+Bemf(t) \qquad \text{[Equation 1]}$$

Here, i(t) is a current flowing in the VCM 802, R is a resistance of the VCM 802, L is an inductance of the VCM 802, and Bemf(t) is a back electromotive force for an angular speed w(t).

In Equation 1, when i(t), which is a current flowing in the VCM 802, becomes 0, V(t)=Bemf(t). The unlatch controller 810 controls the switch 804 to turn on and off such that an acceleration current $1a$ is input to the VCM 802 in a pulse pattern. Referring to FIG. 9, the pulse pattern of the acceleration current to the VCM 802 is comprised of a plurality of cycles of a current pulse with magnitude Ia. An example period of a cycle of a current pulse is indicated as T in FIG. 9.

Referring to FIGS. 8 and 9, the unlatch controller 810 controls the switch 804 to be closed to couple the acceleration current with magnitude Ia from the VCM amplifier 806 to the VCM 802 for an on-time period (i.e., 600 μs in FIG. 9) of the period T. For every period T, after the on-time period, the unlatch controller 810 controls the switch 804 to be opened to uncouple the acceleration current from the VCM 802 for an off-time period (i.e., 400 μs in FIG. 9). Thus, the length of the period T is comprised of the on-time period and the off-time period (i.e., 1 ms in FIG. 9).

During the off-time period, current from the VCM amplifier 806 is disconnected from the VCM 802 with the opened switch 804. Thus, the unlatch controller 810 controls the current flowing through the VCM 802 to become 0 during the off-time period. The unlatch controller 810 detects Bemf(t) when the ADC 812 samples the Bemf(t) of the VCM 802 during the off-time period. In an embodiment of the present invention, the back electromotive force of the VCM 802 is sampled by the ADC 812 toward the end of the off-time period for each cycle of the current pulses (as illustrated by the sample dots in FIG. 9). By sampling for the Bemf of the VCM 802 toward the end of the off-time period, the acceleration current input to the VCM 802 is further ensured of being substantially 0 during such sampling.

In FIG. 9, Tmax is the length of the accelerating time zone for a latch having a maximum magnetic force among sample latches. In that case, a period T of the cycles of acceleration current in FIG. 9 satisfies T<Tmax.

In the conventional unlatch operation, acceleration current with a constant magnitude is continuously provided to a VCM during an acceleration time zone. In contrast, with the present invention, the acceleration current is generated with a pulse pattern since the acceleration current having the magnitude Ia is provided to the VCM 802 intermittently during the acceleration time zone.

Bemf(t) is proportional to a moving speed of a head and is expressed as follows in Equation 2:

$$Bemf(t)=w(t)*Ke \quad \text{[Equation 2]}$$

Here, w(t) is an angular speed of the VCM 802, and Ke is a constant for a back electromotive force of the VCM 802. Referring to Equation 2, since Bemf(t) is proportional to the angular speed w(t) of the VCM 802, the moving speed of the head is calculated using the Bemf(t) indicated from the ADC 812. Generally, the ADC 812 of FIG. 8 includes a detector for sensing an analog value of the Bemf along with converting such an analog value to a digital value.

The unlatch controller 810 compares such a determined moving speed of the head and the threshold speed. From such a comparison, the unlatch controller 810 determines whether to terminate or continue the acceleration time zone by further providing acceleration current pulses to the VCM 802. That is, if the determined moving speed of the head is higher than the threshold speed, the unlatch controller 810 determines that the head properly unlatched from the parking zone and terminates the acceleration time zone to enter a brake time zone in the speed profile of the head. On the other hand, if the determined moving speed of the head is not higher than (or is equal to) the threshold speed, the unlatch controller 810 increases the torque for separating the head from the parking zone by providing the acceleration current pulses to the VCM 802 further extending the acceleration time zone.

In Korean Patent Application Laid-Open No. 1995-703781 and Japanese Patent Application Laid-Open Nos. 2002-208238 and 2001-43645, control of the position and speed of a head in an unlatch operation using a back electromotive force of a VCM are disclosed. However, unlike embodiments of the present invention that limits the moving speed of the head during the acceleration time zone, the prior art controls the moving speed of the head in the brake time zone.

Furthermore, unlike other conventional methods in which the moving speed of the head is controlled by feeding back the Bemf of the VCM, in the present invention, the moving speed of the head is determined to be equivalent to the Bemf of the VCM. In addition with the present invention, the time point when the acceleration time zone is terminated is determined by comparing the determined moving speed of the head with the threshold speed.

FIG. 10 is a flowchart of an unlatch operation performed by the components of FIG. 8, according to an embodiment of the present invention. Referring to FIGS. 8, 9, and 10, the unlatch controller 810 controls the switch 804 to turned on to couple a current Ia from the VCM amplifier 806 to the VCM 802 (step S1002 of FIG. 10) for an on-time period (step S1004 of FIG. 10). For example, the unlatch controller 810 indicates an acceleration current of Ia to the VCM amplifier 806 via the DAC 808 for the on-time period of 600 μs in step S1004. Such acceleration current flowing through the VCM 802 generates a torque for separating the latch within the latch system of the HDD.

After the on-time period of 600 μs, the unlatch controller 810 turns off the switch 804 such that the current output from the VCM amplifier 806 is uncoupled from the VCM 802 (step S1006 of FIG. 10) for an off-time period of 400 μs. Such a finite off-time period of 400 μs ensures that the current flowing through the VCM 802 becomes substantially zero at least toward the end of the off-time period (step S1008 of FIG. 10).

The ADC 812 samples the back electromotive force (Bemf) of the VCM 802 toward the end of the off-time period, and provides the measured Bemf to the unlatch controller 810 (step S1010 of FIG. 10). The unlatch controller 810 determines the moving speed of the head using the measured Bemf of the VCM 802. The unlatch controller 810 compares such a determined moving speed of the head with the threshold speed (step S1012 of FIG. 10). If the determined moving speed of the head is not higher than the threshold speed in step S1012, the flow-chart returns to step S1002 for repeating another cycle, T, of the on-time period and off-time period for the acceleration current pulse.

On the other hand, if the determined moving speed of the head is higher than the threshold speed in step S1012, the unlatch controller 810 determines that the head has properly moved away from the parking zone. At that point, the unlatch controller 810 terminates the acceleration time zone and begins the brake time zone for a speed profile of the head (as illustrated in FIG. 9 when the slope of the speed profile begins to decrease).

During such a brake time zone, the unlatch controller 810 turns on the switch 804 to couple a brake current from the VCM amplifier 806 to the VCM 802 (step S1014 of FIG. 10). The unlatch controller 810 indicates the magnitude of the brake current to the VCM amplifier 806 via the DAC 808 (step S1016 of FIG. 10).

In this manner, the time point for terminating the acceleration time zone and starting the brake time zone is determined by the moving speed of the head during the acceleration time zone. Such a moving speed of the head is gradually increased to near the threshold speed guaranteeing that the head is properly separated from the parking zone, even for various latch forces for different HDDs. Furthermore, the moving speed of the head is limited to the threshold speed to prevent unstable operation of the head. Thus, disc scratching is minimized, and servo operations are generally more stable.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for unlatching a head within a data storage device, comprising:

a VCM (voice coil motor) amplifier with a switch that applies acceleration current pulses to a voice coil motor (VCM) for unlatching the head during an acceleration time zone;

an analog to digital converter for indicating a speed of the head during the acceleration time zone; and an unlatch controller for controlling the VCM amplifier with the switch for determining a duration of the acceleration time zone that controls a number of cycles of the acceleration current pulses applied on the VCM such that the speed of the head is not substantially higher than a threshold speed, wherein each cycle of acceleration current pulse has a predetermined on-time period and a predetermined off-time period.

2. The apparatus of claim 1, wherein the unlatch controller controls the switch to couple the acceleration current from the VCM amplifier to the VCM for the on-time period of the cycle of acceleration current pulse, and controls the switch to uncouple the acceleration current from the VCM for the off-time period of the cycle of acceleration current pulse.

3. The apparatus of claim 2, wherein the analog to digital converter samples a back electromotive force of the VCM that indicates the speed of the head during the off-time period of the cycle of acceleration current pulse.

4. The apparatus of claim 2, wherein the analog to digital converter samples a back electromotive force of the VCM that indicates the speed of the head, toward the end of the off-time period of the cycle of acceleration current pulse.

5. The apparatus of claim 2, wherein the analog to digital converter samples a back electromotive force of the VCM that indicates the speed of the head toward the end of the off-time period for each cycle of acceleration current pulse applied on the VCM.

6. The apparatus of claim 2, wherein a period T of the cycle of acceleration current pulse is comprised of the on-time period and the off-time period, and wherein T<Tmax with Tmax being an acceleration time zone when the head is latched with a maximum magnetic force.

7. The apparatus of claim 1, wherein the analog to digital converter samples a back electromotive force of the VCM that indicates the speed of the head during the off-time period when substantially zero acceleration current is applied on the VCM.

8. The apparatus of claim 1, wherein the unlatch controller controls the VCM amplifier and the switch to apply a brake current to the VCM after termination of the acceleration time zone.

9. The apparatus of claim 1, wherein the data storage device is a HDD (hard disc drive).

10. A HDD (hard disc drive), comprising:
a head for reading/writing data from/to a disc;
a latch system for latching the head to a parking zone;
a voice coil motor (VCM) for moving the head;
a VCM amplifier with a switch that applies acceleration current pulses to the VCM for unlatching the head during an acceleration time zone;
an analog to digital converter for indicating a speed of the head during the acceleration time zone; and
an unlatch controller for controlling the VCM amplifier with the switch for determining a duration of the acceleration time zone that controls a number of cycles of the acceleration current pulses applied on the VCM such that the speed of the head is not substantially higher than a threshold speed, wherein each cycle of acceleration current pulse has a predetermined on-time period and a predetermined off-time period.

11. The HDD of claim 10, wherein the unlatch controller controls the switch to couple the acceleration current from the VCM amplifier to the VCM for the on-time period of the cycle of acceleration current pulse, and controls the switch to uncouple the acceleration current from the VCM for the off-time period of the cycle of acceleration current pulse.

12. The HDD of claim 11, wherein the analog to digital converter samples a back electromotive force of the VCM that indicates the speed of the head during the off-time period of the cycle of acceleration current pulse.

13. The HDD of claim 11, wherein the analog to digital converter samples a back electromotive force of the VCM that indicates the speed of the head toward the end of the off-time period for each cycle of acceleration current pulse applied on the VCM.

14. The HDD of claim 11, wherein a period T of the cycle of acceleration current pulse is comprised of the on-time period and the off-time period, and wherein T<Tmax with Tmax being an acceleration time zone when the head is latched with a maximum magnetic force.

15. A method for unlatching a head within a data storage device, comprising:
A. applying acceleration current pulses to a voice coil motor (VCM) for unlatching the head during an acceleration time zone;
B. determining a speed of the head during the acceleration time zone; and
C. controlling a duration of the acceleration time zone to control a number of cycles of the acceleration current pulses applied on the VCM such that the speed of the head is not substantially higher than a threshold speed, wherein each cycle of acceleration current pulse has a predetermined on-time period and a predetermined off-time period.

16. The method of claim 15, wherein the step A includes:
controlling a switch to couple the acceleration current to the VCM for the on-time period of the cycle of acceleration current pulse; and
controlling the switch to uncouple the acceleration current from the VCM for the off-time period of the cycle of acceleration current pulse.

17. The method of claim 16, wherein the step B is performed during the off-time period of the cycle of acceleration current pulse.

18. The method of claim 16, wherein the step B is performed toward the end of the off-time period of the cycle of acceleration current pulse.

19. The method of claim 18, wherein the speed of the head is determined in step B by measuring a back electromotive force of the VCM.

20. The method of claim 16, wherein the step B is performed toward the end of the off-time period for each cycle of acceleration current pulse applied on the VCM.

21. The method of claim 16, wherein a period T of the cycle of acceleration current pulse is comprised of the on-time period and the off-time period, and wherein T<Tmax with Tmax being an acceleration time zone when the head is latched with a maximum magnetic force.

22. The method of claim 15, wherein the speed of the head is determined in step B by measuring a back electromotive force of the VCM.

23. The method of claim 22, wherein the back electromotive force of the VCM is measured during the off-time period when substantially zero acceleration current is applied on the VCM.

24. The method of claim 15, wherein the data storage device is a HDD (hard disc drive).

25. The method of claim 15, further comprising:
applying a brake current to the VCM after termination of the acceleration time zone.

* * * * *